US008238069B2

(12) United States Patent
Adachi et al.

(10) Patent No.: US 8,238,069 B2
(45) Date of Patent: Aug. 7, 2012

(54) ESD PROTECTION DEVICE

(75) Inventors: Jun Adachi, Kouga (JP); Jun Urakawa, Omihachiman (JP); Takahiro Sumi, Omihachiman (JP); Takahiro Kitazume, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 68 days.

(21) Appl. No.: 12/846,878

(22) Filed: Jul. 30, 2010

(65) Prior Publication Data

US 2010/0309595 A1 Dec. 9, 2010

Related U.S. Application Data

(63) Continuation of application No. PCT/JP2009/050928, filed on Jan. 22, 2009.

(30) Foreign Application Priority Data

Feb. 5, 2008 (JP) ................................ 2008-025392
Dec. 10, 2008 (JP) ................................ 2008-314771

(51) Int. Cl.
*H02H 1/00* (2006.01)

(52) U.S. Cl. ........................................ 361/56; 361/212

(58) Field of Classification Search .................... 361/56, 361/111, 212, 220
See application file for complete search history.

(56) References Cited

U.S. PATENT DOCUMENTS

| | | | | |
|---|---|---|---|---|
| 6,942,833 | B2 * | 9/2005 | Kawakami et al. | 264/672 |
| 7,570,473 | B2 * | 8/2009 | Adachi et al. | 361/120 |
| 2009/0091233 | A1 * | 4/2009 | Te-Pang | 313/243 |

FOREIGN PATENT DOCUMENTS

| | | | |
|---|---|---|---|
| EP | 2 061 123 | A1 | 5/2009 |
| JP | 01-311585 | A | 12/1989 |
| JP | 02-046679 | A | 2/1990 |
| JP | 8-17548 | A | 1/1996 |
| JP | 2000-77163 | A | 3/2000 |
| JP | 2001-43954 | A | 2/2001 |
| JP | 2001-122660 | A | 5/2001 |
| JP | 2001-338831 | A | 12/2001 |
| JP | 2002094930 | * | 3/2002 |
| JP | 2002-298643 | A | 10/2002 |
| JP | 2003-297524 | A | 10/2003 |
| JP | 2004-14437 | A | 1/2004 |
| JP | 2005-276666 | A | 10/2005 |
| JP | 2005-285957 | A | 10/2005 |
| JP | 2006-54061 | A | 2/2006 |
| WO | 2008/146514 | A1 | 12/2008 |

OTHER PUBLICATIONS

Official Communication issued in International Patent Application No. PCT/JP2009/050928, mailed on Mar. 24, 2009.

* cited by examiner

*Primary Examiner* — Danny Nguyen
(74) *Attorney, Agent, or Firm* — Keating & Bennett, LLP

(57) ABSTRACT

An ESD protection device has a structure that allows ESD characteristics to be easily adjusted and stabilized. The ESD protection device includes a ceramic multilayer substrate, at least a pair of discharge electrodes located in the ceramic multilayer substrate and facing each other with a space disposed therebetween, and external electrodes located on a surface of the ceramic multilayer substrate and connected to the discharge electrodes. The ESD protection device includes a supporting electrode disposed in a region that connects the pair of discharge electrodes. The supporting electrode is made of a conductive material coated with an inorganic material having no conductivity.

8 Claims, 8 Drawing Sheets

ESD PROTECTION DEVICE

BACKGROUND OF THE INVENTION

1. Field of the Invention

The present invention relates to an ESD protection device. In particular, the present invention relates to technologies for preventing breakdown and deformation of a ceramic multilayer substrate caused by, for example, cracking in an ESD protection device that includes discharge electrodes facing each other in a cavity of the ceramic multilayer substrate.

2. Description of the Related Art

ESD (electro-static discharge) is a phenomenon in which strong discharge is generated when a charged conductive body (e.g., human body) comes into contact with or comes sufficiently close to another conductive body (e.g., electronic device). ESD causes damage or malfunctioning of electronic devices. To prevent it, it is necessary not to apply an excessively high discharge voltage generated during discharge to circuits of the electronic devices. ESD protection devices, which are also called surge absorbers, are used for such an application.

An ESD protection device is disposed, for instance, between a signal line and ground of the circuit. The ESD protection device includes a pair of discharge electrodes facing each other with a space disposed therebetween. Therefore, the ESD protection device has high resistance under normal operation and a signal is not sent to the ground. An excessively high voltage, for example, generated by static electricity through an antenna of a mobile phone or the like causes discharge between the discharge electrodes of the ESD protection device, which leads the static electricity to the ground. Thus, a voltage generated by static electricity is not applied to the circuits disposed downstream from the ESD protection device, which allows for protection of the circuits.

An ESD protection device shown in an exploded perspective view of FIG. 9 and a sectional view of FIG. 10 includes a cavity 5 formed in a ceramic multilayer substrate 7 made by laminating insulating ceramic sheets 2. Discharge electrodes 6 facing each other and connected to external electrodes 1 are disposed in the cavity 5 that contains a discharge gas. When a breakdown voltage is applied between the discharge electrodes 6, discharge is caused between the discharge electrodes 6 in the cavity 5, which leads an excessive voltage to the ground. Consequently, the circuits disposed downstream from the ESD protection device can be protected (for example, refer to Japanese Unexamined Patent Application Publication No. 2001-43954).

However, such an ESD protection device has the following problem.

In the ESD protection device shown in FIGS. 9 and 10, the responsiveness to ESD easily varies due to the variation in the space between the discharge electrodes. Furthermore, although the responsiveness to ESD needs to be adjusted using an area of the region sandwiched between discharge electrodes facing each other, the adjustment is limited because of a product size or the like. Therefore, it may be difficult to achieve a desired responsiveness to ESD.

SUMMARY OF THE INVENTION

In view of the foregoing, preferred embodiments of the present invention provide an ESD protection device having ESD characteristics that are easily adjusted and stabilized.

An ESD protection device according to a preferred embodiment of the present invention includes a ceramic multilayer substrate; at least a pair of discharge electrodes provided in the ceramic multilayer substrate and facing each other with a space disposed therebetween; and external electrodes provided on a surface of the ceramic multilayer substrate and connected to the discharge electrodes. The ESD protection device includes a supporting electrode disposed in a region that connects the pair of discharge electrodes, the supporting electrode being made of a conductive material coated with an inorganic material having no conductivity.

In the structure described above, when a voltage equal to or higher than a certain voltage is applied between the external electrodes, discharge is generated between the discharge electrodes facing each other. The discharge is generated along the region where the space between the pair of discharge electrodes is located. Since the ESD protection device includes the supporting electrode with a conductive material dispersed therein in that region, electrons easily move and discharge is efficiently generated. As a result, the responsiveness to ESD can be improved. This can decrease the variation in the responsiveness to ESD due to the variation in the space between the discharge electrodes. Thus, ESD characteristics are easily adjusted and stabilized.

Since the supporting electrode with a conductive material dispersed therein is included so as to be adjacent to the counter portions of the discharge electrodes where discharge is generated, a discharge starting voltage can be set to be a desired value by adjusting the amount or kind of the conductive material contained in the supporting electrode. The discharge starting voltage can be set with high precision compared with the case where a discharge starting voltage is adjusted using only the space between the counter portions of the discharge electrodes.

The inorganic material preferably includes at least portions of elements constituting the ceramic multilayer substrate.

Since the inorganic material that coats the conductive material includes portions of elements constituting the ceramic multilayer substrate, adhesiveness of the supporting electrode to the ceramic multilayer substrate is improved and detachment of the supporting electrode when firing does not easily occur. Cyclic durability is also improved.

A ceramic material is preferably added to the supporting electrode.

A ceramic material included in the supporting electrode can decrease the differences in shrinkage behavior and a coefficient of thermal expansion between the supporting electrode and the ceramic multilayer substrate. Moreover, the ceramic material disposed between the conductive materials further prevents the contact between the conductive materials. As a result, a short circuit between the discharge electrodes can be prevented.

The ceramic material preferably includes at least portions of elements constituting the ceramic multilayer substrate.

In this case, the differences in shrinkage behavior and a coefficient of thermal expansion between the supporting electrode and the ceramic multilayer substrate are easily decreased.

The ceramic material is preferably a semiconductor, for example.

In this case, a semiconductor material that contributes to discharge improves the ESD characteristics.

The conductive material coated with the inorganic material is preferably included in the supporting electrode at a percentage of about 10 vol % or more and about 85 vol % or less, for example.

When the content of the conductive material in the supporting electrode is about 10 vol % or more, the shrinkage starting temperature of the supporting electrode when firing can be adjusted to an intermediate value between the shrinkage starting temperatures of the ceramic multilayer substrate and the discharge electrodes. When the content of the conductive material is about 85 vol % or less, a short circuit established between the discharge electrodes due to the conductive material in the supporting electrode can be prevented.

The ceramic multilayer substrate preferably includes a cavity therein and the discharge electrodes are preferably arranged along an inner surface of the cavity.

In this case, the discharge generated between the discharge electrodes by applying a voltage equal to or higher than a certain voltage between the external electrodes is creeping discharge that is mainly generated along an interface between the cavity and the ceramic multilayer substrate. Since the supporting electrode is arranged along the interface, that is, the inner surface of the cavity, electrons easily move and discharge is efficiently generated. As a result, the responsiveness to ESD can be improved. This can decrease the variation in the responsiveness to ESD due to the variation in the space between the discharge electrodes. Thus, ESD characteristics are easily adjusted and stabilized.

The ceramic multilayer substrate is preferably obtained by alternately laminating first ceramic layers that are not substantially sintered and second ceramic layers that have been sintered.

In this case, the ceramic multilayer substrate is a non-shrinkage substrate in which the shrinkage in an in-plane direction of the second ceramic layers is suppressed by the first ceramic layers when firing. In the non-shrinkage substrate, almost no size variation in the in-plane direction is caused. When the non-shrinkage substrate is used for the ceramic multilayer substrate, the space sandwiched between the discharge electrodes facing each other can be formed with high precision. Consequently, characteristic variation such as a discharge starting voltage can be decreased.

The ESD characteristics of the ESD protection device according to various preferred embodiments of the present invention are easily adjusted and stabilized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Examples will now be described as preferred embodiments of the present invention with reference to FIGS. 1 to 8.

Example 1

Figure 1:
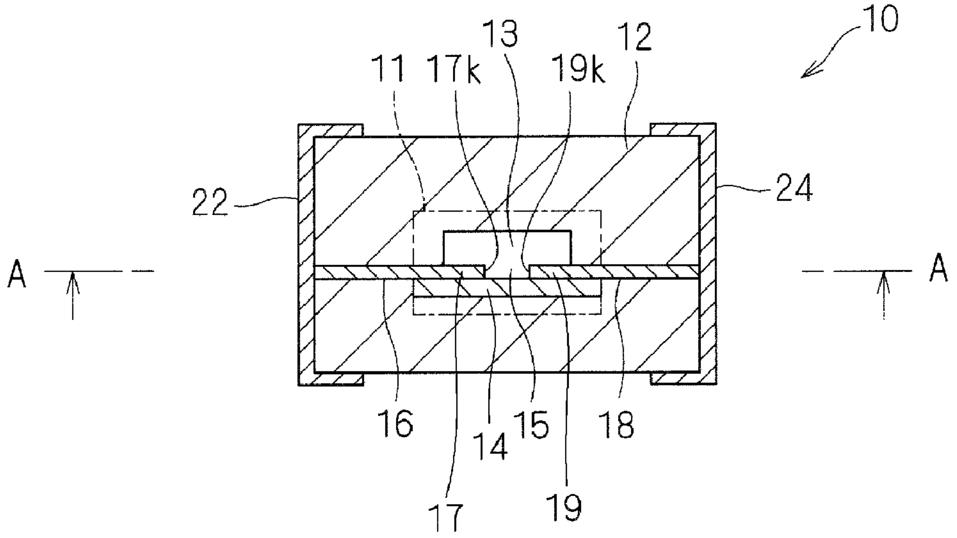
FIG. 1 is a sectional view of an ESD protection device (Example 1).
Figure 2:
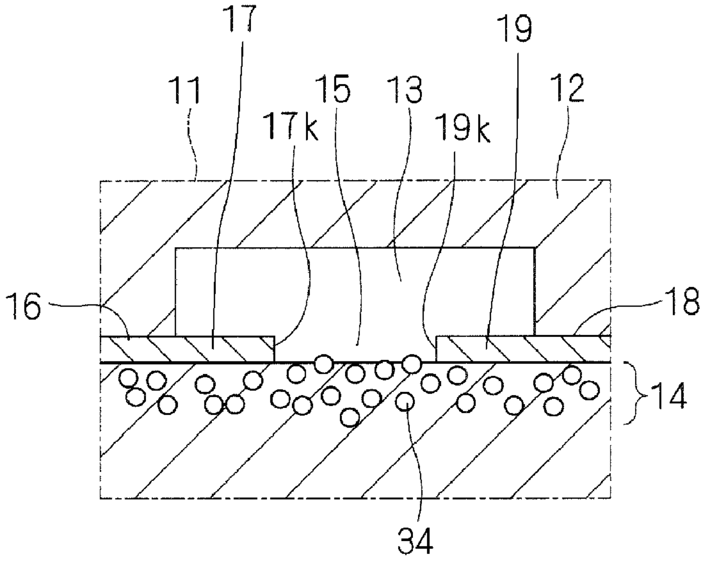
FIG. 2 is an enlarged sectional view of a principal portion of the ESD protection device (Example 1).
Figure 3:
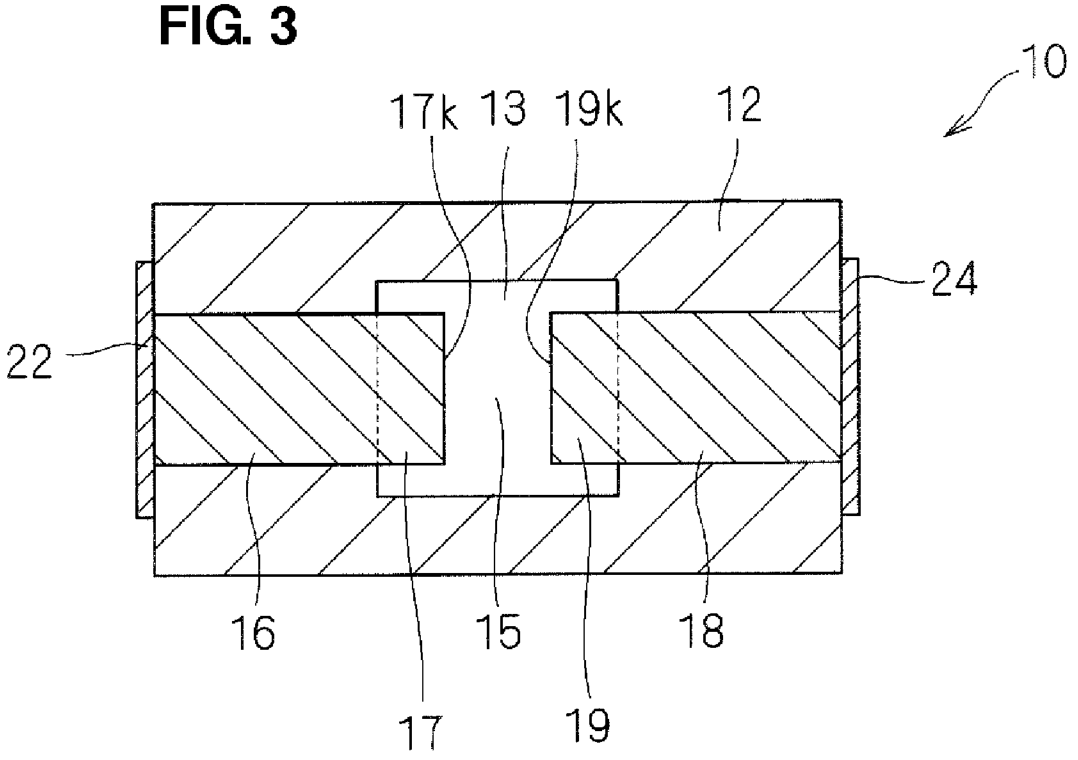
FIG. 3 is a sectional view taken along line A-A of FIG. 1 (Example 1).

An ESD protection device 10 of Example 1 is described with reference to FIGS. 1 to 4. FIG. 1 is a sectional view of the ESD protection device 10. FIG. 2 is an enlarged sectional view of a principal portion schematically showing a region 11 indicated by a chain line in FIG. 1. FIG. 3 is a sectional view taken along line A-A of FIG. 1.

As shown in FIG. 1, the ESD protection device 10 includes a cavity 13 and a pair of discharge electrodes 16 and in a ceramic multilayer substrate 12. The discharge electrodes 16 and 18 respectively include counter portions 17 and 19 arranged along the inner surface of the cavity 13. The discharge electrodes 16 and 18 extend from the cavity 13 to the outer surface of the ceramic multilayer substrate 12, and are respectively connected to external electrodes 22 and 24 located outside of the ceramic multilayer substrate 12, that is, on the surface of the ceramic multilayer substrate 12. The external electrodes 22 and 24 are used for mounting the ESD protection device 10.

As shown in FIG. 3, edges 17*k* and 19*k* of the counter portions 17 and 19 of the discharge electrodes 16 and 18 face each other with a space 15 disposed therebetween. When a voltage equal to or higher than a certain voltage is applied from the external electrodes 22 and 24, an electric discharge is generated between the counter portions 17 and 19 of the discharge electrodes 16 and 18.

As shown in FIG. 1, a supporting electrode 14 is provided in the periphery of the cavity 13 so as to be adjacent to the counter portions 17 and 19 of the discharge electrodes 16 and 18 and to the space 15 formed between the counter portions 17 and 19. In other words, the supporting electrode 14 is disposed in a region that connects the discharge electrodes 16 and 18. The supporting electrode 14 is in contact with the counter portions 17 and 19 of the discharge electrodes 16 and 18 and the ceramic multilayer substrate 12. As simply shown in FIG. 2, the supporting electrode 14 includes a particulate conductive material 34 dispersed in a ceramic base material.

Figure 4:
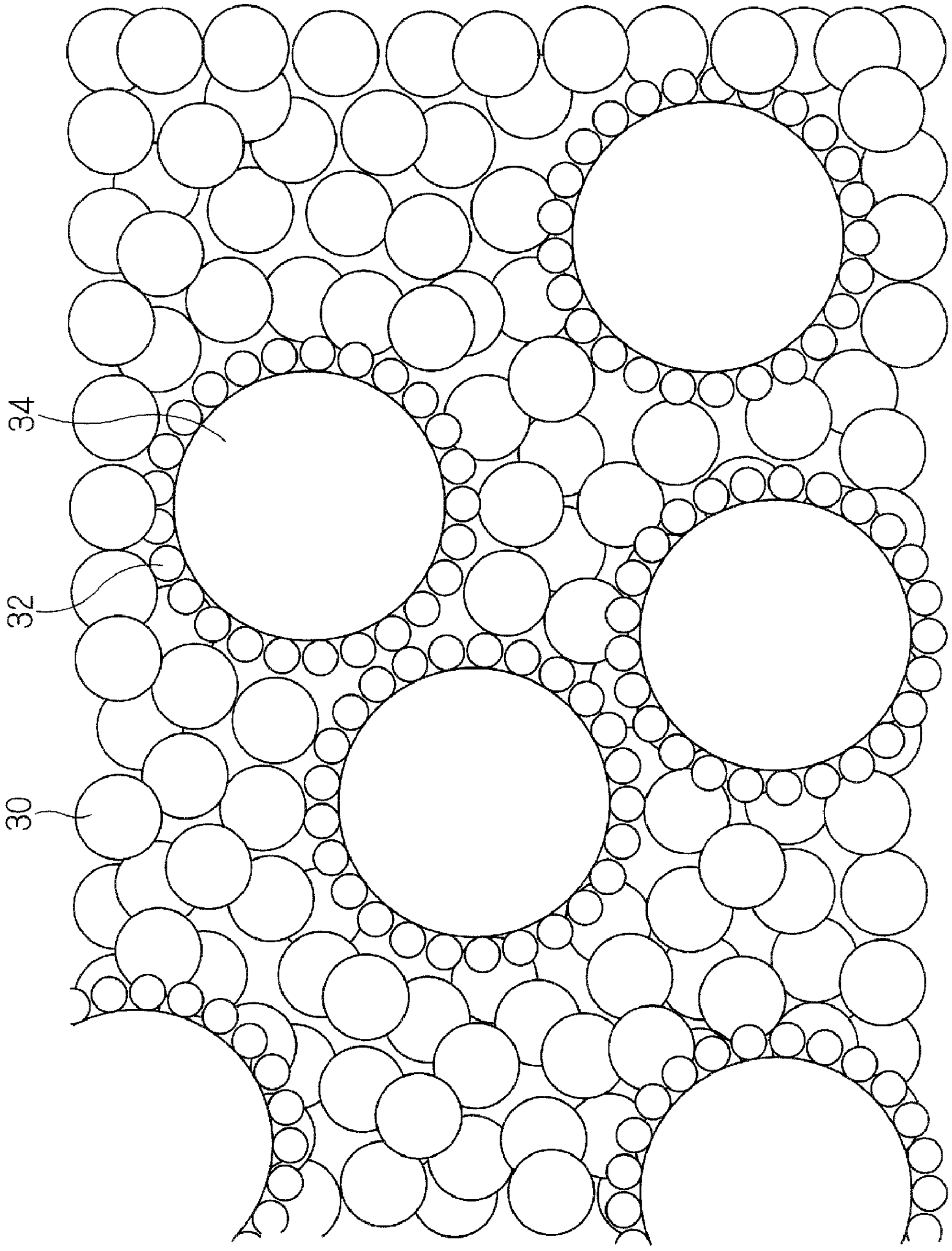
FIG. 4 is a diagram schematically showing a structure of a supporting electrode before firing (Example 1).

Specifically, as shown in FIG. 4 that is a schematic view of a structure, the supporting electrode 14 includes the conductive material 34 that is coated with inorganic material 32 having no conductivity and ceramic material 30. For example, the conductive material 34 is constituted by Cu particles having a diameter of about 2 μm to about 3 μm, the inorganic material 32 is constituted by $Al_2O_3$ particles having a diameter of about 1 μm or less, and the ceramic material 30 is constituted by BAS particles composed of $Al_2O_3$, Ba, and Si.

The inorganic material 32 and the ceramic material 30 react with each other when being fired, and may be metamorphosed after the firing. The ceramic material and ceramic powder constituting the multilayer substrate 12 also react with each other when being fired, and may be metamorphosed after the firing.

In the case where the conductive material 34 is not coated with the inorganic material 32, the particles of the conductive material 34 may be in contact with each other even before firing. Consequently, a short circuit may be established due to the connection between the particles of the conductive material 34. The possibility of establishing short circuits increases in proportion to the ratio of the conductive material 34.

In contrast, in the case where the conductive material 34 is coated with the inorganic material 32, the particles of the conductive material 34 are not in contact with each other before firing. Even if the inorganic material 32 is altered after firing, the particles of the conductive material 34 are still separated from each other. The possibility of establishing short circuits due to the connection between the particles of the conductive material 34 is decreased by coating the conductive material 34 with the inorganic material 32.

The ceramic material 30 in a base material of the supporting electrode 14 may be the same as a ceramic material of the ceramic multilayer substrate 12 or different from such a ceramic material. However, by using the same ceramic material, the shrinkage behavior or the like of the supporting electrode can be easily matched with that of the ceramic multilayer substrate 12, which can decrease the number of types of materials used. In particular, when the ceramic material 30 and the ceramic material of the ceramic multilayer substrate 12 are the same and cannot be distinguished from each other, the supporting electrode can be assumed to be formed of only the conductive material coated with the inorganic material.

The conductive material 34 contained in the supporting electrode 14 may be the same as a material of the discharge electrodes 16 and 18 or different from such a material, for example. However, by using the same material, the shrinkage behavior or the like of the supporting electrode 14 can be easily matched with that of the discharge electrodes 16 and 18, which can decrease the number of types of materials used.

Since the supporting electrode 14 includes the conductive material 34 and the ceramic material 30, the shrinkage behavior of the supporting electrode 14 when firing is controlled to be an intermediate shrinkage behavior between those of the ceramic multilayer substrate 12 and the discharge electrodes 16 and 18 including the counter portions 17 and 19. Thus, the difference in shrinkage behavior when firing between the ceramic multilayer substrate 12 and the counter portions 17 and 19 of the discharge electrodes 16 and 18 can be reduced by using the supporting electrode 14. As a result, failure due to, for example, detachment of the counter portions 17 and 19 of the discharge electrodes 16 and 18 or characteristic variation can be prevented. In addition, the variation of characteristics such as a discharge starting voltage can be prevented because the variation of the space 15 between the counter portions 17 and 19 of the discharge electrodes 16 and 18 is prevented.

The coefficient of thermal expansion of the supporting electrode 14 can be adjusted to an intermediate value between the ceramic multilayer substrate 12 and the discharge electrodes 16 and 18. Thus, the difference in a coefficient of thermal expansion between the ceramic multilayer substrate 12 and the counter portions 17 and 19 of the discharge electrodes 16 and 18 can be reduced by using the supporting electrode 14. As a result, failure due to, for example, detachment of the counter portions 17 and 19 of the discharge electrodes 16 and 18 or the changes of characteristics over time can be prevented.

By adjusting the amount or kind of the conductive material 34 contained in the supporting electrode 14, the discharge starting voltage can be set to be a desirable voltage. The discharge starting voltage can be set with high precision compared with the case where a discharge starting voltage is adjusted using only the space 15 between the counter portions 17 and 19 of the discharge electrodes 16 and 18.

A manufacturing example of the ESD protection device 10 will now be described.

(1) Preparation of Materials

A material mainly composed of Ba, Al, and Si was used as a ceramic material of the ceramic multilayer substrate 12. Raw materials were prepared and mixed so as to have a desirable composition, and then calcined at 800° C. to 1000° C. The calcined powder was pulverized into ceramic powder using a zirconia ball mill for 12 hours. The ceramic powder was mixed with an organic solvent such as toluene or liquid-fuel. The mixture was further mixed with a binder and a plasticizer to obtain slurry. The slurry was formed into ceramic green sheets having a thickness of 50 μm by a doctor blade method.

Electrode paste for forming the discharge electrodes 16 and 18 was prepared. A solvent was added to 80 wt % Cu powder having an average particle size of about 2 μm and a binder resin composed of ethyl cellulose and the like. The admixture was then stirred and mixed using a roll to obtain electrode paste.

To obtain mixture paste for forming the supporting electrode 14, $Al_2O_3$-coated Cu powder having an average particle size of about 2 μm and the calcined ceramic powder of BAS material described above were mixed in a certain ratio. A binder resin and a solvent were added to the admixture, and then the admixture was stirred and mixed using a roll. The mixture paste was prepared so as to contain 20 wt % of the resin and the solvent and 80 wt % of the ceramic material and the coated Cu powder. Table 1 shows the ratio of ceramic/coated Cu powder in each mixture paste. Table 2 shows a material type that coats Cu powder used for comparative evaluation. The coated amount (wt %) in Table 2 is a ratio of a coating material to coated Cu powder by mass.

TABLE 1

Volume ratio of ceramic/coated Cu

| Paste No. | Volume ratio (vol %) Ceramic powder | Coated Cu powder |
|---|---|---|
| *1 | 100 | 0 |
| 2 | 90 | 10 |
| 3 | 70 | 30 |
| 4 | 50 | 50 |
| 5 | 40 | 60 |
| 6 | 30 | 70 |
| 7 | 20 | 80 |
| 8 | 15 | 85 |
| 9 | 0 | 100 |

*Outside the scope of the present invention

TABLE 2

Material type that coats Cu for evaluation

| Coating material | Coated amount (wt %) | | |
|---|---|---|---|
| $Al_2O_3$ | 0 (no coating) | 1 | 3 |

Resin paste for forming the cavity 13 was manufactured in the same manner. The resin paste was composed of only a resin and a solvent. A resin material that is decomposed or eliminated by firing was used. Examples of the resin material include PET, polypropylene, ethyl cellulose, and an acrylic resin.

(2) Application of Mixture Paste, Electrode Paste, and Resin Paste by Screen Printing The mixture paste was applied to a ceramic green sheet in a certain pattern by screen printing to form the supporting electrode 14. When the mixture paste is thick, a depression disposed in the ceramic green sheet in advance may be filled with the mixture paste of ceramic/coated metal.

The electrode paste was applied to the mixture paste to form the discharge electrodes 16 and 18 having the space 15 that is a discharge gap between the counter portions 17 and 19. In this case, the width of the discharge electrodes 16 and 18 was 100 μm and the discharge gap width (the size of the space 15 between the counter portions 17 and 19) was 30 μm. The resin paste was then applied to the electrode paste to form the cavity 13.

(3) Lamination and Pressure Bonding

Ceramic green sheets were laminated and pressure bonded in the same manner as that of typical ceramic multilayer substrates. In this manufacturing example, a laminate having a thickness of 0.3 mm was formed such that the cavity 13 and the counter portions 17 and 19 of the discharge electrodes 16 and 18 were arranged in the center of the laminate.

(4) Cutting and Application of End Surface Electrodes

The laminate was cut into chips using a microcutter in the same manner as that of chip-type electronic components such as LC filters. In this manufacturing example, the laminate was cut into chips having a size of 1.0 mm×0.5 mm. Subsequently, the external electrodes 22 and 24 were formed by applying the electrode paste to the end surfaces of the chips.

(5) Firing

The chips were fired in a $N_2$ atmosphere in the same manner as that of typical ceramic multilayer substrates. In the case where a noble gas such as Ar or Ne is introduced into the cavity 13 to decrease the response voltage to ESD, the chips may be fired in an atmosphere of the noble gas such as Ar or Ne in a temperature range in which the ceramic material is shrunk and sintered. If the electrode material is not oxidized (e.g., Ag), the chips may be fired in the air.

The resin paste was eliminated by firing and the cavity 13 was formed. The organic solvent in the ceramic green sheets and the binder resin and solvent in the mixture paste were also eliminated.

(6) Plating

Ni—Sn electroplating was conducted on the external electrodes in the same manner as that of chip-type electronic components such as LC filters.

The ESD protection device 10 having a section shown in FIGS. 1 to 3 has been completed through the steps described above.

The ceramic material is not particularly limited to the material described above, and may be mixed with other materials. Such a ceramic material may be a mixture of forsterite and glass or a mixture of $CaZrO_3$ and glass.

To prevent delamination, such a ceramic material is preferably the same as a ceramic material that forms at least one layer of the ceramic multilayer substrate.

In terms of responsiveness to ESD, such a ceramic material is preferably a semiconductor because a semiconductor material also contributes to creeping discharge. Examples of the semiconductor ceramic material include carbides such as silicon carbide, titanium carbide, zirconium carbide, molybdenum carbide, and tungsten carbide; nitrides such as titanium nitride, zirconium nitride, chromium nitride, vanadium nitride, and tantalum nitride; silicides such as titanium silicide, zirconium silicide, tungsten silicide, molybdenum silicide and chromium silicide; borides such as titanium boride, zirconium boride, chromium boride, lanthanum boride, molybdenum boride, and tungsten boride; and oxides such as zinc oxide and strontium titanate. In particularly, silicon carbide is preferable because it is relatively inexpensive and has commercially available variations with a variety of particle sizes. These semiconductor ceramic materials may be used alone or in combination, and may be used as a mixture with an insulating ceramic material such as alumina or a BAS material.

The conductive material is also not limited to Cu, and may be Ag, Pd, Pt, Al, Ni, W or a combination thereof. A material having conductivity lower than that of a metal material, the material including a resistive material and a semiconductor material such as SiC powder, may be used as the conductive material. The use of a semiconductor material or a resistive material as the conductive material prevents short circuits.

A coating material that coats the conductive material is not particularly limited as long as it is an inorganic material. Such a coating material may be an inorganic material such as $Al_2O_3$, $ZrO_2$, or $SiO_2$ or a mixed calcined material such as BAS. To prevent delamination, the coating material preferably has the same components as those of the ceramic material described above or contains at least an element constituting the ceramic material or the ceramic multilayer substrate. When a coating material that coats a conductive material includes portions of elements constituting a ceramic multilayer substrate, the adhesiveness of a supporting electrode to the ceramic multilayer substrate is improved. As a result, detachment of the supporting electrode does not easily occur when firing and cyclic durability is also improved.

The mixture material of ceramic/coated metal is not necessarily used as paste, and may be provided in the form of a sheet.

The resin paste is applied to form the cavity 13. However, a material such as carbon that is eliminated by firing may be used instead of a resin. Moreover, the resin paste is not necessarily applied by screen printing, and a resin film or the like may be pasted only at a desired position.

One hundred of the ESD protection devices 10 thus prepared were evaluated for a short circuit between the discharge electrodes 16 and 18, disconnection after firing, and the presence or absence of delamination by observing internal sections thereof. When the incidence of short circuits was 40% or less, the short circuit characteristic was defined as good. When the incidence of short circuits was more than 40%, the short circuit characteristic was defined as poor. The case where no delamination was observed was defined as “good”. The case where even one delamination was observed was defined as “poor”. The delamination herein means detachment between the supporting electrode and discharge electrodes or between the supporting electrode and the ceramic multilayer substrate.

The shrinkage starting temperatures of the pastes were compared. Specifically, to examine the shrinkage behavior of each of the pastes, each of the pastes was dried to form powder. The powder was pressed to form a pressure-bonded body having a thickness of 3 mm. The pressure-bonded body was then subjected to TMA (thermal mechanical analysis). The shrinkage starting temperature of the ceramic material was 885° C., which was the same as that of the paste No. 1.

The discharge responsiveness to ESD was evaluated. The discharge responsiveness to ESD was measured using an electrostatic discharge immunity test provided in IEC61000-4-2, which is a standard of IEC. When 8 kV was applied using contact discharge, whether discharge was generated between the discharge electrodes of samples was measured. When a peak voltage detected on a protection circuit side was more than 700 V, the discharge responsiveness was defined as “poor”. When the peak voltage was 500 V to 700 V, the discharge responsiveness was defined as “good”. When the peak voltage was less than 500 V, the discharge responsiveness was particularly defined as “excellent”.

ESD cyclic durability was evaluated. After ten 8 kV applications, ten 4 kV applications, ten 2 kV applications, ten 1 kV applications, ten 0.5 kV applications, and ten 0.2 kV applications were performed, the discharge responsiveness to ESD was evaluated. When a peak voltage detected on a protection circuit side was more than 700 V, the discharge responsiveness was defined as "poor". When the peak voltage was 500 V to 700 V, the discharge responsiveness was defined as "good". When the peak voltage was less than 500 V, the discharge responsiveness was particularly defined as "excellent".

Tables 3 to 5 show the conditions of the mixture paste of ceramic/coated metal and the evaluation results.

TABLE 3

| Coated amount 0 wt % (no coating) | | | | | | | | | |
|---|---|---|---|---|---|---|---|---|---|
| | Volume ratio (vol %) | | Paste shrinkage starting | Incidence of short | Incidence of discon- | | Discharge | ESD | |
| Sample No. | Ceramic powder | Cu powder | temperature (° C.) | circuits (%) | nection (%) | Delamination | responsive-ness to ESD | cyclic durability | Overall evaluation |
| *1 | 100 | 0 | 885 | 10 | 6 | existence | good | — | poor |
| *2 | 90 | 10 | 840 | 0 | 0 | nonexistence | excellent | poor | poor |
| *3 | 70 | 30 | 810 | 0 | 0 | nonexistence | excellent | poor | poor |
| *4 | 50 | 50 | 780 | 0 | 0 | nonexistence | excellent | poor | poor |

*Outside the scope of the present invention

TABLE 4

| Coated amount 1 wt % | | | | | | | | | |
|---|---|---|---|---|---|---|---|---|---|
| | Volume ratio (vol %) | | Paste shrinkage starting | Incidence of short | Incidence of discon- | | Discharge | ESD | |
| Sample No. | Ceramic powder | Coated Cu powder | temperature (° C.) | circuits (%) | nection (%) | Delamination | responsive-ness to ESD | cyclic durability | Overall evaluation |
| *1 | 100 | 0 | 885 | 10 | 6 | existence | good | — | poor |
| 2 | 90 | 10 | 850 | 0 | 0 | nonexistence | good | good | good |
| 3 | 70 | 30 | 830 | 0 | 0 | nonexistence | good | good | good |
| 4 | 50 | 50 | 800 | 0 | 0 | nonexistence | excellent | good | good |
| 5 | 40 | 60 | 790 | 0 | 0 | nonexistence | excellent | good | good |
| 6 | 30 | 70 | 780 | 0 | 0 | nonexistence | excellent | good | good |
| 7 | 20 | 80 | 765 | 20 | 2 | nonexistence | excellent | good | good |
| 8 | 15 | 85 | 765 | 20 | 2 | nonexistence | excellent | good | good |
| 9 | 0 | 100 | 760 | 40 | 4 | nonexistence | excellent | good | good |

*Outside the scope of the present invention

TABLE 5

| Coated amount 3 wt % | | | | | | | | | |
|---|---|---|---|---|---|---|---|---|---|
| | Volume ratio (vol %) | | Paste shrinkage starting | Incidence of short | Incidence of discon- | | Discharge | ESD | |
| Sample No. | Ceramic powder | Coated Cu powder | temperature (° C.) | circuits (%) | nection (%) | Delamination | responsive-ness to ESD | cyclic durability | Overall evaluation |
| *1 | 100 | 0 | 885 | 10 | 6 | existence | good | — | poor |
| 2 | 90 | 10 | 860 | 0 | 0 | nonexistence | good | good | good |
| 3 | 70 | 30 | 840 | 0 | 0 | nonexistence | good | good | good |
| 4 | 50 | 50 | 810 | 0 | 0 | nonexistence | good | good | good |
| 5 | 40 | 60 | 800 | 0 | 0 | nonexistence | good | good | good |
| 6 | 30 | 70 | 790 | 0 | 0 | nonexistence | excellent | excellent | excellent |
| 7 | 20 | 80 | 785 | 0 | 0 | nonexistence | excellent | excellent | excellent |
| 8 | 15 | 85 | 785 | 5 | 0 | nonexistence | excellent | excellent | excellent |
| 9 | 0 | 100 | 780 | 20 | 2 | nonexistence | excellent | good | good |

*Outside the scope of the present invention

As is evident from Tables 3 to 5, the shrinkage starting temperatures of the pastes were brought close to the shrinkage starting temperature of the ceramic material by using the mixture paste of ceramic/coated metal even under the conditions under which the ratio of ceramic powder is low. As a result, delamination and discharge electrode detachment were prevented.

As is clear from Table 3, when the supporting electrode is composed of a ceramic material and a metal, ESD cyclic durability was significantly poor. When the ratio of a metal to the mixture paste of ceramic/metal exceeds 50%, the incidence of short circuits established between the discharge electrodes was more than 25% due to the contact between metal particles in the mixture paste. Consequently, a practicable ESD protection device was not obtained. As is evident from Tables 4 and 5, in contrast, when the supporting electrode is composed of a ceramic material and a coated metal, resistance to short circuits can be improved even if the content of the coated metal is increased.

As is clear from Tables 3 to 5, the discharge responsiveness to ESD did not deteriorate and was maintained at a good level even when the mixture paste of ceramic/coated metal was provided. The variation of the gap width between the discharge electrodes was also low.

When the coated amount is more than 7 wt %, the incidence of short circuits was 0%. However, the shrinkage starting temperatures between the pastes and the discharge electrodes deviate from each other, which caused delamination. The coated amount is preferably about 0.5 wt % to about 5 wt %, for example.

As described above, by providing the mixture paste of ceramic/coated metal to the portion between the discharge electrodes and the ceramic multilayer substrate and to the discharge gap portion, the stress produced between the discharge electrodes and the ceramic multilayer substrate can be decreased. Furthermore, disconnection of the discharge electrodes, delamination of the discharge electrodes, short circuits due to the electrode detachment at the cavity, the variation of the discharge gap width due to the shrinkage variation of the electrodes can be prevented.

The ratio of the coated metal having a coated amount of about 0.5 wt % to about 5 wt % to the mixture paste is preferably about 10 vol % to about 85 vol %, for example.

In the case of no coating, the ratio of the metal to the mixture paste is desirably about 50 vol % or less due to the occurrence of short circuits. By using the coated metal, the occurrence of short circuits is suppressed, which makes it possible to use the coated metal up to about 85 vol %. By increasing the content of a metal, heat generated during electrostatic discharge (sparking) can be further dissipated. Microcracks in the ceramic material due to thermal stress can be reduced and prevented because of the improvement in heat dissipation.

<Modification>

ESD protection devices 10*a* to 10*i* of modification will be described with reference to FIGS. 5A to 7I. FIGS. 5A to 7I are perspective views of the ESD protection devices 10*a* to 10*i*. Respective pairs of discharge electrodes 16*a* to 16*i* and 18*a* to 18*i* arranged so as to have spaces therebetween, supporting electrodes 14*a* to 14*i*, and external electrodes 22*a* to 22*i* and 24*a* to 24*i* are diagonally shaded. Only the cases where the supporting electrodes 14*a* to 14*i* are respectively formed at the gap regions between the discharge electrodes 16*a* to 16*i* and 18*a* to 18*i* are shown in the drawings. However, the supporting electrodes 14*a* to 14*i* may be formed in regions larger than the regions shown in the drawings. For example, the supporting electrodes 14*a* to 14*i* may be arranged so as to overlap the discharge electrodes 16*a* to 16*i* and 18*a* to 18*i*. In other words, the supporting electrodes 14*a* to 14*i* need only be formed in regions that respectively connect the discharge electrodes 16*a* to 16*i* to the discharge electrodes 18*a* to 18*i*. Cavities (not shown) are formed so as to overlap regions between the discharge electrodes 16*a* to 16*i* and 18*a* to 18*i* and portions of the discharge electrodes 16*a* to 16*i* and 18*a* to 18*i* that are adjacent to the regions. The portions of the discharge electrodes 16*a* to 16*i* and 18*a* to 18*i* that are close to the regions between the discharge electrodes 16*a* to 16*i* and 18*a* to 18*i* are counter portions that are disposed along the inner surfaces of the cavities so as to face each other.

Figure 5A:
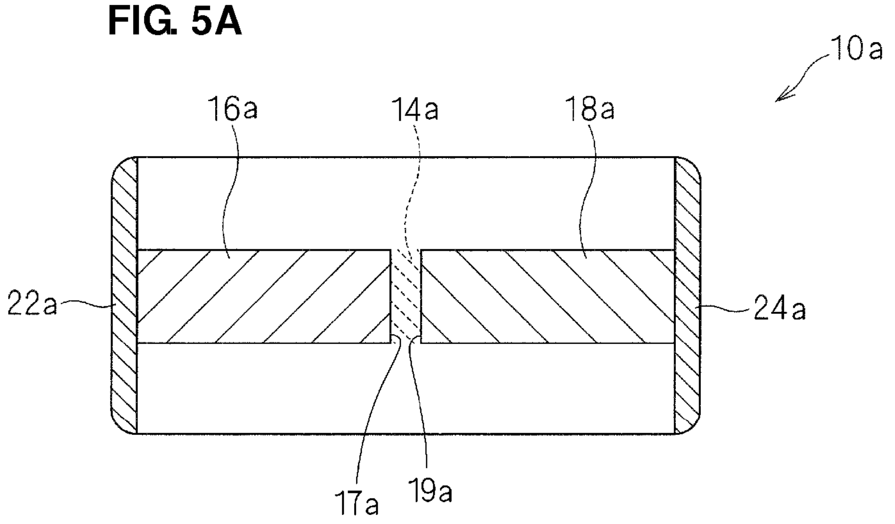
FIGS. 5A to 5C are perspective views of ESD protection devices (modification).
Figure 5B:
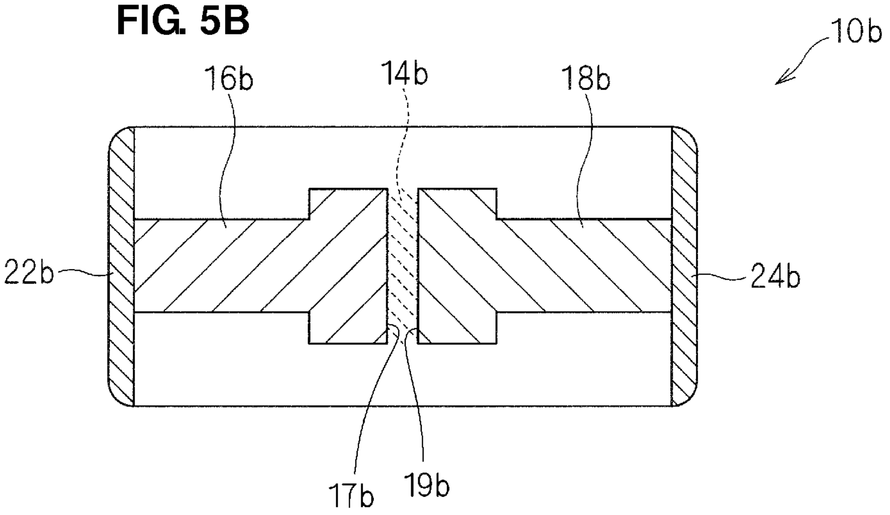
Figure 5C:
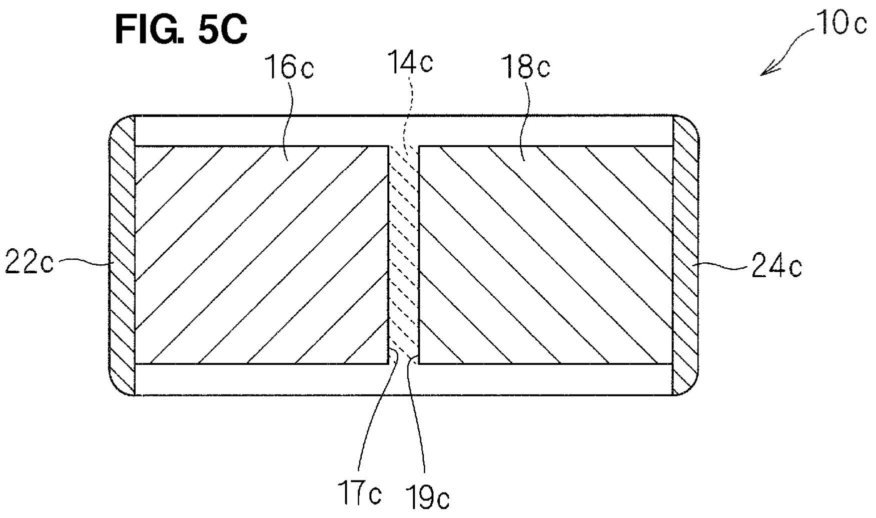

The ESD protection devices 10*a* to 10*c* shown in FIG. 5 respectively include substantially linear discharge electrodes 16*a* to 16*c* and 18*a* to 18*c* whose edges face each other. Discharge starting voltage decreases with increasing width of the counter portions 17*a* to 17*c* and 19*a* to 19*c* of the discharge electrodes 16*a* to 16*c* and 18*a* to 18*c* that respectively face each other. Therefore, wider counter portions can provide higher response speed to ESD.

Figure 6D:
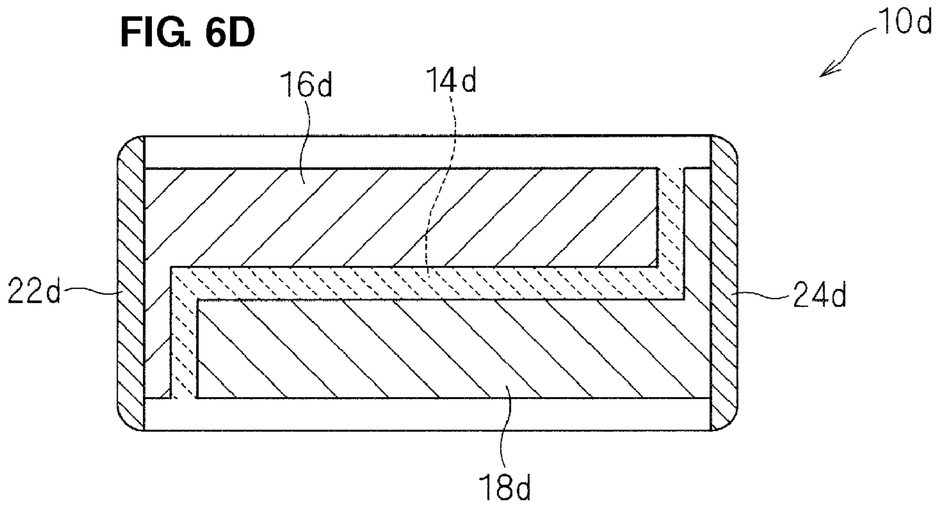
FIGS. 6D to 6F are perspective views of ESD protection devices (modification).
Figure 6E:
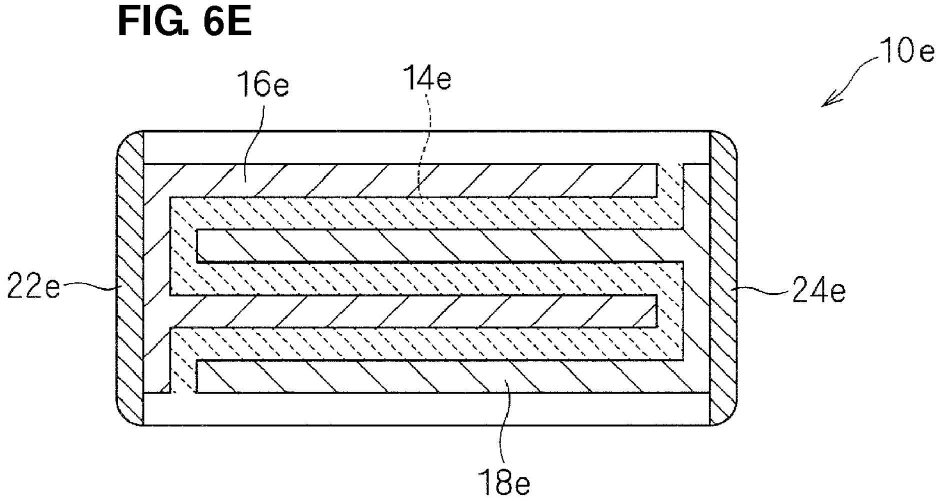
Figure 6F:
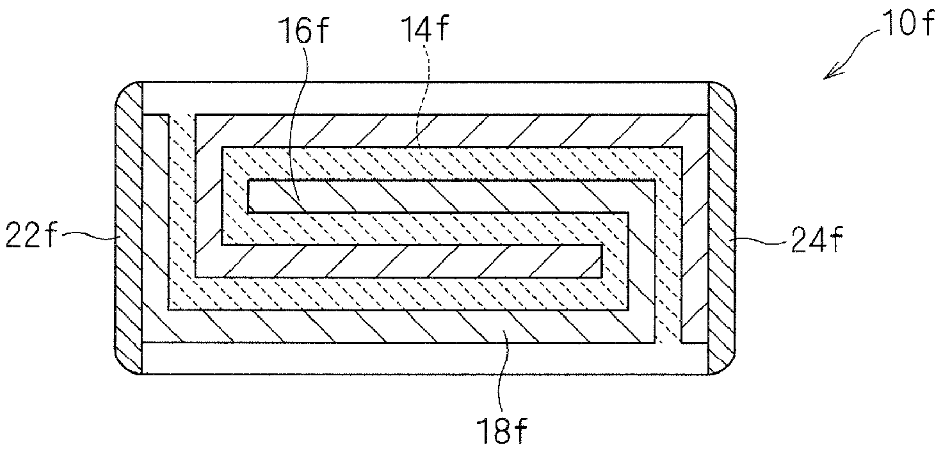

In the ESD protection devices 10*d* to 10*f* shown in FIG. 6, the regions sandwiched between the discharge electrodes 16*d* to 16*f* and 18*d* to 18*f*, that is, the supporting electrode 14*d* to 14*f* preferably have a bent shape. The width of the discharge electrodes 16*d* to 16*f* and 18*d* to 18*f* that respectively face each other is larger than that of the ESD protection devices 10*a* to 10*c* shown in FIG. 5. Therefore, the response speed to ESD can be further increased.

Figure 7G:
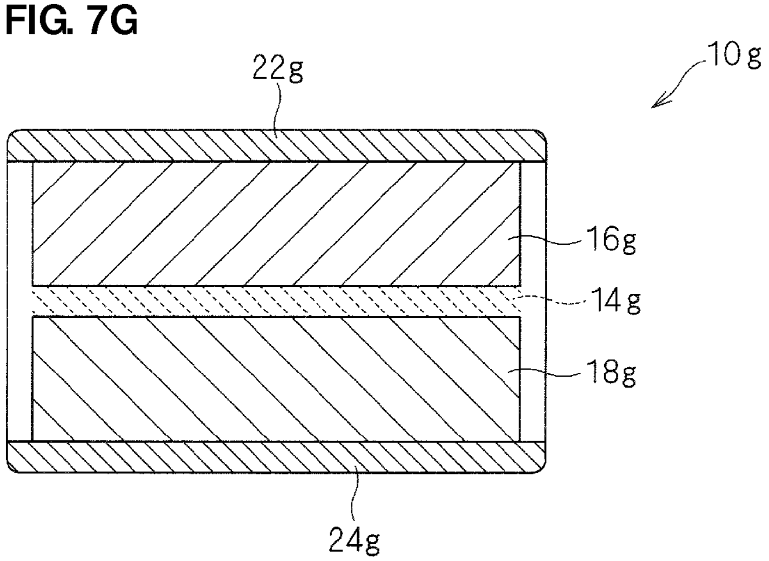
FIGS. 7G to 7I are perspective views of ESD protection devices (modification).
Figure 7H:
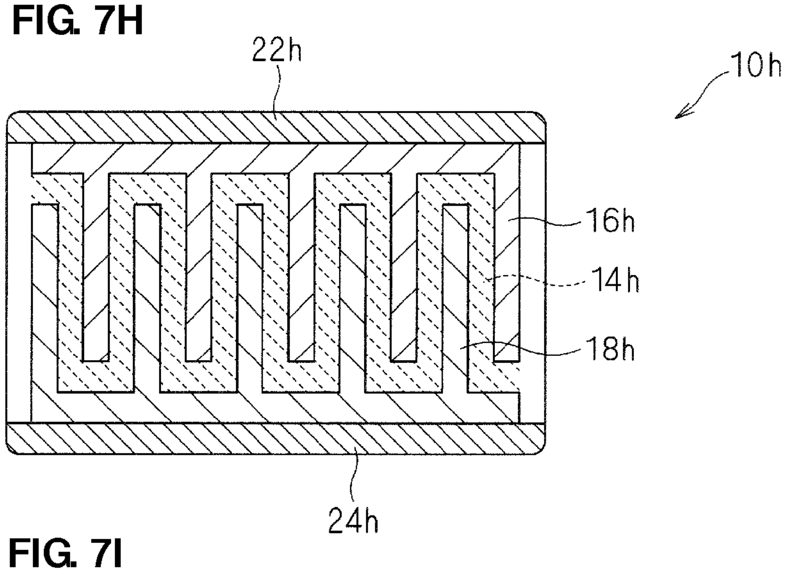

In the ESD protection devices 10*g* and 10*h* shown in FIGS. 7G and 7H, the external electrodes 22*g* and 22*h* and 24*g* and 24*h* are arranged along the long sides of a rectangular ceramic multilayer substrate. The width of the discharge electrodes 16*g* and 16*h* and 18*g* and 18*h* that respectively face each other is easily increased compared with the case where the external electrodes 22*a* to 22*f* and 24*a* to 24*f* are arranged along the short sides of a rectangular ceramic multilayer substrate as with the ESD protection devices 10*a* to 10*f* shown in FIGS. 5 and 6.

Figure 7I:
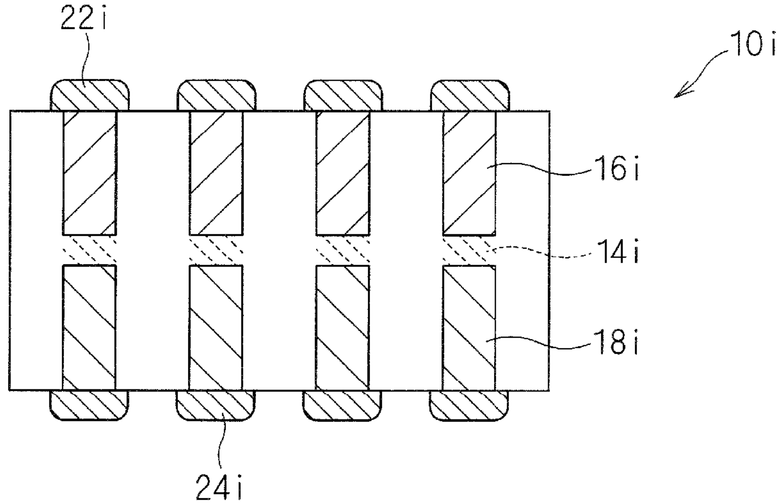

The ESD protection device 10*i* shown in FIG. 7I includes multiple pairs of discharge electrodes 16*i* and 18*i*, supporting electrodes 14*i*, and external electrodes 22*i* and 24*i* in its single body. In this manner, the width of the discharge electrodes 16*i* and 18*i* that face each other is also increased, which can increase the response speed to ESD.

Example 2

Figure 8:
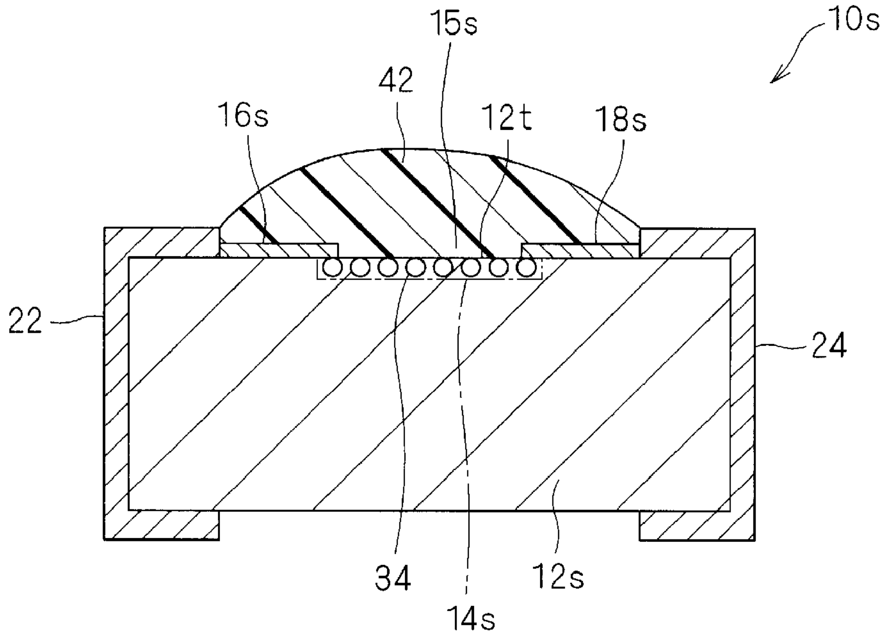
FIG. 8 is a sectional view of an ESD protection device (Example 2).
Figure 9:
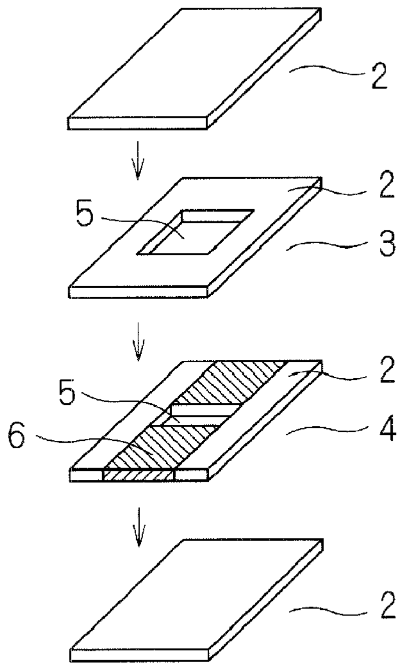
FIG. 9 PRIOR ART
FIG. 9 is an exploded perspective view of a conventional ESD protection device.
Figure 10:
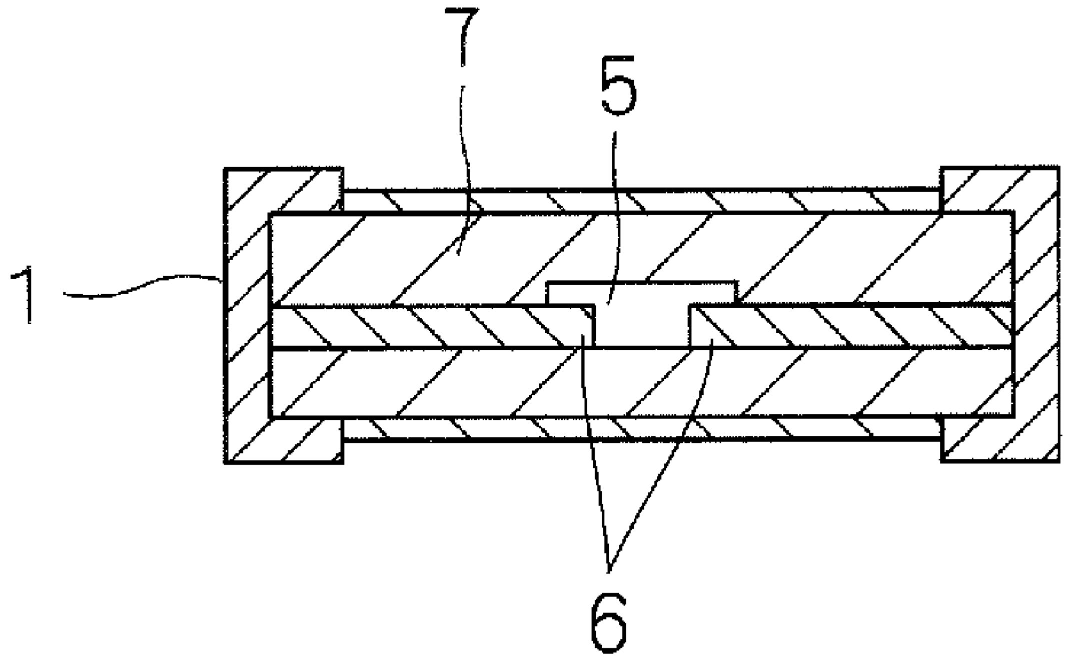
FIG. 10 PRIOR ART
FIG. 10 is a sectional view of the conventional ESD protection device.

An ESD protection device 10*s* of Example 2 will be described with reference to FIG. 8. FIG. 8 is a sectional view of the ESD protection device 10*s*.

The ESD protection device 10*s* of Example 2 has substantially the same structure as that of the ESD protection device 10 of Example 1. The same components as in Example 1 are designated by the same reference numerals, and the difference from the ESD protection device 10 is mainly described.

As shown in FIG. 8, the ESD protection device 10*s* of Example 2 is the same as the ESD protection device 10 of Example 1 except that the ESD protection device 10*s* does not include the cavity 13. That is to say, the ESD protection device 10*s* of Example 2 includes a pair of discharge electrodes 16*s* and 18*s* facing each other that are disposed on an upper surface 12*t* of a ceramic multilayer substrate 12*s* and covered with a resin 42.

The discharge electrodes 16*s* and 18*s* are arranged so as to face each other with a space 15*s* disposed therebetween as with the ESD protection device 10 of Example 1. On the upper surface 12*t* side of the ceramic multilayer substrate 12*s*, a supporting electrode 14*s* in which a conductive material 34 coated with an inorganic material having no conductivity is dispersed is arranged so as to be in contact with a region where the space 15*s* between the discharge electrodes 16*s* and 18*s* is provided and its adjacent region. That is, the supporting electrode 14*s* is provided in the region that connects the discharge electrodes 16*s* and 18*s*. The discharge electrodes 16*s* and 18*s* are connected to external electrodes 22 and 24 provided on the surface of the ceramic multilayer substrate 12*s*.

A manufacturing example of Example 2 will now be described. The ESD protection device of Example 2 was manufactured by substantially the same method as that of the ESD protection device of Example 1. However, the resin paste was not applied because the ESD protection device of Example 2 does not include the cavity. As in the manufacturing example of Example 1, wt % $Al_2O_3$-coated Cu was used as a conductive material and calcined ceramic powder of BAS material was used as a ceramic material.

Table 6 shows the conditions of the mixture paste of ceramic/coated metal and the evaluation results.

TABLE 6

Coated amount 3 wt %

| Sample No. | Volume ratio (vol %) Ceramic powder | Coated Cu powder | Paste shrinkage starting temperature (° C.) | Incidence of short circuits (%) | Incidence of discon-nection (%) | Delamination | Discharge responsive-ness to ESD | ESD cyclic durability | Overall evaluation |
|---|---|---|---|---|---|---|---|---|---|
| *1 | 100 | 0 | 885 | 10 | 6 | existence | good | — | poor |
| 2 | 90 | 10 | 860 | 0 | 0 | nonexistence | good | good | good |
| 3 | 70 | 30 | 840 | 0 | 0 | nonexistence | good | good | good |
| 4 | 50 | 50 | 810 | 0 | 0 | nonexistence | good | good | good |
| 5 | 40 | 60 | 800 | 0 | 0 | nonexistence | good | good | good |
| 6 | 30 | 70 | 790 | 0 | 0 | nonexistence | good | good | good |
| 7 | 20 | 80 | 785 | 0 | 0 | nonexistence | good | good | good |
| 8 | 15 | 85 | 785 | 5 | 0 | nonexistence | good | good | good |
| 9 | 0 | 100 | 780 | 20 | 2 | nonexistence | good | good | good |

*Outside the scope of the present invention

As is clear from a comparison between Tables 5 and 6, although the ESD protection device of Example 2 that does not include a cavity can be put to practical use, its discharge responsiveness to ESD tends to decrease compared with that of the ESD protection device of Example 1 that includes a cavity. It is believed that the ESD protection device including a cavity has better discharge responsiveness to ESD because creeping discharge can be generated at the supporting electrode of the discharge electrodes when ESD is applied.

Example 3

An ESD protection device of Example 3 will be described.

The ESD protection device of Example 3 is the same as that of Example 1 except that the ceramic material of the supporting electrode is a semiconductor.

In a manufacturing example of Example 3, the ESD protection device was manufactured using silicon carbide, which is a ceramic semiconductor, as the ceramic material. The particle size of silicon carbide was about 1 μm, for example. Furthermore, 3 wt % $Al_2O_3$-coated Cu was used as a conductive material as in the manufacturing example of Example 1.

Table 7 shows the conditions of the mixture paste of ceramic/coated metal and the evaluation results.

TABLE 7

| Coated amount 3 wt % | | | | | | | | | |
|---|---|---|---|---|---|---|---|---|---|
| | Volume ratio (vol %) | | Paste shrinkage starting | Incidence of short | Incidence of discon- | | Discharge | ESD | |
| Sample No. | Ceramic powder | Coated Cu powder | temperature (° C.) | circuits (%) | nection (%) | Delamination | responsive-ness to ESD | cyclic durability | Overall evaluation |
| *1 | 100 | 0 | 890 | 8 | 5 | existence | good | — | poor |
| 2 | 90 | 10 | 865 | 0 | 0 | nonexistence | excellent | excellent | excellent |
| 3 | 70 | 30 | 845 | 0 | 0 | nonexistence | excellent | excellent | excellent |
| 4 | 50 | 50 | 815 | 0 | 0 | nonexistence | excellent | excellent | excellent |
| 5 | 40 | 60 | 805 | 0 | 0 | nonexistence | excellent | excellent | excellent |
| 6 | 30 | 70 | 795 | 0 | 0 | nonexistence | excellent | excellent | excellent |
| 7 | 20 | 80 | 790 | 0 | 0 | nonexistence | excellent | excellent | excellent |
| 8 | 15 | 85 | 790 | 5 | 0 | nonexistence | excellent | excellent | excellent |
| 9 | 0 | 100 | 785 | 20 | 2 | nonexistence | excellent | good | good |

*Outside the scope of the present invention

As is clear from a comparison between Tables 5 and 7, the discharge responsiveness to ESD can be improved by using silicon carbide as a ceramic material even if the content of a coated metal is low. This is because the ceramic semiconductor also contributes to discharge, which improves ESD characteristics.

Example 4

An ESD protection device of Example 4 will be described.

The ESD protection device of Example 4 is the same as that of Example 1 except that the coating material is the same as the ceramic material.

In a manufacturing example of Example 4, the ESD protection device was manufactured in the same manner as that of the manufacturing example of Example 1 except that Cu powder coated with calcined ultarafine powder of BAS material was used. In other words, the calcined ceramic powder of BAS material obtained in the manufacturing example of Example 1 was dispersed in an acetone medium. Minute media made of zirconia were then inserted into the dispersed solution and pulverization was performed using a continuous medium wet grinding mill. Subsequently, acetone and the minute media made of zirconia were removed to make calcined ultarafine powder of BAS material having a particle size of about 100 nm, for example. The resultant calcined ultarafine powder of BAS material and Cu powder having an average particle size of about 2 μm were mixed by mechanofusion to obtain Cu powder coated with the calcined ultarafine powder of BAS material. The coated amount of the calcined ultarafine powder of BAS material was about 1 wt %, for example.

Table 8 shows the conditions of the mixture paste of ceramic/coated metal and the evaluation results.

TABLE 8

| Coated amount 1 wt % | | | | | | | | | |
|---|---|---|---|---|---|---|---|---|---|
| | Volume ratio (vol %) | | Paste shrinkage starting | Incidence of short | Incidence of discon- | | Discharge | ESD | |
| Sample No. | Ceramic powder | Coated Cu powder | temperature (° C.) | circuits (%) | nection (%) | Delamination | responsive-ness to ESD | cyclic durability | Overall evaluation |
| *1 | 100 | 0 | 885 | 10 | 6 | existence | good | — | poor |
| 2 | 90 | 10 | 840 | 0 | 0 | nonexistence | good | good | good |
| 3 | 70 | 30 | 820 | 0 | 0 | nonexistence | good | good | good |
| 4 | 50 | 50 | 790 | 0 | 0 | nonexistence | excellent | excellent | excellent |
| 5 | 40 | 60 | 780 | 0 | 0 | nonexistence | excellent | excellent | excellent |
| 6 | 30 | 70 | 770 | 0 | 0 | nonexistence | excellent | excellent | excellent |
| 7 | 20 | 80 | 755 | 15 | 1 | nonexistence | excellent | good | good |
| 8 | 15 | 85 | 755 | 15 | 1 | nonexistence | excellent | good | good |
| 9 | 0 | 100 | 750 | 30 | 2 | nonexistence | excellent | good | good |

*Outside the scope of the present invention

As is clear from a comparison between Tables 3 and 8, the incidences of short circuits and disconnection tend to be improved by using an inorganic material, as a coating material, having the same components as those of the ceramic material, though the mechanism is uncertain.

Example 5

An ESD protection device of Example 5 will be described.

The ESD protection device of Example 5 is the same as that of Example 1 except that the ceramic multilayer substrate is made by alternately laminating shrinkage suppression layers and base layers.

In a manufacturing example of the ESD protection device of Example 5, paste for shrinkage suppression layers (e.g., composed of $Al_2O_3$ powder, glass frit, and an organic vehicle) is applied by screen printing on the entire surface of the ceramic green sheet that is the same as that of the manufacturing example of Example 1. The mixture paste is then applied thereon in a certain pattern by screen printing to form the supporting electrode 14. Subsequently, the electrode paste is applied thereon to form the discharge electrodes 16 and 18 having the space 15 that is a discharge gap between the counter portions 17 and 19. In this case, the width of the discharge electrodes 16 and 18 was 100 μm and the discharge gap width (the size of the space 15 between the counter portions 17 and 19) was 30 μm, for example. The resin paste is then applied thereon to form the cavity 13. The paste for shrinkage suppression layers is further applied thereon by screen printing.

An ESD protection device whose ceramic multilayer substrate is a non-shrinkage substrate in which shrinkage suppression layers and base layers are alternately laminated was formed in the same manner as that of the manufacturing example of Example 1 except that the ceramic multilayer substrate was made by alternately laminating shrinkage suppression layers and base layers. In other words, the base layers have been sintered, but the shrinkage suppression layers are not substantially sintered after firing. Herein, 3 wt % $Al_2O_3$-coated Cu was used as a conductive material as in the manufacturing example of Example 1.

Table 9 shows the conditions of the mixture paste of ceramic/coated metal and the evaluation results.

As is evident from Table 9, a good ESD protection device was obtained as in the manufacturing example of Example 1. In the non-shrinkage substrate, the shrinkage of the base layers in an in-plane direction thereof when firing is suppressed by the shrinkage suppression layers, which causes almost no size variation in the in-plane direction. Since the non-shrinkage substrate was used for the ceramic multilayer substrate, an ESD protection device with significantly low warpage was obtained.

CONCLUSION

As described above, a material that is obtained by mixing a conductive material and a ceramic material and has an intermediate shrinkage behavior between those of a ceramic material and an electrode material is disposed between discharge electrodes and a ceramic multilayer substrate and at the gap portion between the edges of the discharge electrodes to form a supporting electrode. As a result, the stress produced between the discharge electrodes and the ceramic multilayer substrate can be decreased. Furthermore, disconnection of the discharge electrodes, delamination of the discharge electrodes, detachment of the discharge electrodes at the cavity, the variation of the discharge gap width due to the shrinkage variation of the discharge electrodes, and short circuits can be prevented.

Since the conductive material is coated with an inorganic material having no conductivity, the contact between the particles of the conductive material can be prevented in the supporting electrode, thus decreasing the incidence of short circuits caused by connection between the particles of the conductive material.

Accordingly, the discharge starting voltage of an ESD protection device can be precisely set, and the ESD protection device is easily adjusted and stabilized.

The advantages achieved by various preferred embodiments of the present invention include:

(1) With a coated conductive material, a large amount of conductive material can be contained, which achieves good responsiveness to ESD.

(2) With a coated conductive material, the responsiveness to ESD does not deteriorate even after repeated applications of ESD.

TABLE 9

Coated amount 3 wt %

| Sample No. | Volume ratio (vol %) Ceramic powder | Coated Cu powder | Paste shrinkage starting temperature (° C.) | Incidence of short circuits (%) | Incidence of discon-nection (%) | Delamination | Discharge responsive-ness to ESD | ESD cyclic durability | Overall evaluation |
|---|---|---|---|---|---|---|---|---|---|
| *1 | 100 | 0 | 885 | 10 | 6 | existence | good | — | poor |
| 2 | 90 | 10 | 860 | 0 | 0 | nonexistence | good | good | good |
| 3 | 70 | 30 | 840 | 0 | 0 | nonexistence | good | good | good |
| 4 | 50 | 50 | 810 | 0 | 0 | nonexistence | good | good | good |
| 5 | 40 | 60 | 800 | 0 | 0 | nonexistence | good | good | good |
| 6 | 30 | 70 | 790 | 0 | 0 | nonexistence | excellent | excellent | excellent |
| 7 | 20 | 80 | 785 | 0 | 0 | nonexistence | excellent | excellent | excellent |
| 8 | 15 | 85 | 785 | 5 | 0 | nonexistence | excellent | excellent | excellent |
| 9 | 0 | 100 | 780 | 20 | 2 | nonexistence | excellent | good | good |

*Outside the scope of the present invention (3) Since an inorganic material includes the same components as those of a ceramic material or at least a portion of elements constituting the ceramic material or the ceramic multilayer substrate, delamination hardly occurs.

(4) Since the ceramic material is the same as a ceramic material that forms at least one layer of the ceramic multilayer substrate, delamination hardly occurs.

(5) With a cavity, creeping discharge can be expected, which further improves the responsiveness to ESD.

(6) When a ceramic semiconductor is used as the ceramic material, good responsiveness to ESD can be achieved even if the content of a coated metal is low.

(7) When silicon carbide is used as the ceramic material, an inexpensive good ESD protection device can be provided.

(8) When Cu powder is used as the conductive material, an inexpensive good ESD protection device can be provided.

The present invention is not limited to the preferred embodiments described above, and various modifications can be made.

For example, although the supporting electrode is preferably provided on the ceramic multilayer substrate side in Example 2, the supporting electrode may be provided on the resin side.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An ESD protection device comprising:

a ceramic multilayer substrate;

at least a pair of discharge electrodes located in the ceramic multilayer substrate and facing each other with a space disposed therebetween;

external electrodes located on a surface of the ceramic multilayer substrate and connected to the discharge electrodes; and a supporting electrode disposed in a region that connects the pair of discharge electrodes, the supporting electrode being made of a mixture paste including conductive material particles dispersed therein that are coated with inorganic material particles having no conductivity.

2. The ESD protection device according to claim 1, wherein the inorganic material particles contains at least portions of elements constituting the ceramic multilayer substrate.

3. The ESD protection device according to claim 1, wherein a ceramic material is included in the supporting electrode.

4. The ESD protection device according to claim 3, wherein the ceramic material includes at least portions of elements constituting the ceramic multilayer substrate.

5. The ESD protection device according to claim 3, wherein the ceramic material is a semiconductor.

6. The ESD protection device according to claim 3, wherein the conductive material particles coated with the inorganic material particles included in the supporting electrode at a percentage of about 10 vol % or more and about 85 vol % or less.

7. The ESD protection device according to claim 1, wherein the ceramic multilayer substrate includes a cavity therein and the discharge electrodes are arranged along an inner surface of the cavity.

8. The ESD protection device according to claim 1, wherein the ceramic multilayer substrate includes first ceramic layers that are not substantially sintered and second ceramic layers that have been sintered being alternately layered on each other.

* * * * *